US012702987B2

(12) United States Patent
Collias et al.

(10) Patent No.: US 12,702,987 B2
(45) Date of Patent: Aug. 11, 2026

(54) METHOD FOR IMPROVING LITHIUM YIELD IN A DIRECT LITHIUM EXTRACTION PROCESS

(71) Applicant: Aquatech International, LLC, Canonsburg, PA (US)

(72) Inventors: Constantine Collias, Ontario (CA); Daniel Travis Shay, Chadds Ford, PA (US); Mohamed Yehia Areef, Middlesbrough (GB)

(73) Assignee: Aquatech International, LLC, Canonsburg, PA (US)

( * ) Notice: Subject to any disclaimer, the term of this patent is extended or adjusted under 35 U.S.C. 154(b) by 0 days.

(21) Appl. No.: 19/042,027

(22) Filed: Jan. 31, 2025

(65) Prior Publication Data

US 2025/0249465 A1 Aug. 7, 2025

Related U.S. Application Data

(60) Provisional application No. 63/548,869, filed on Feb. 2, 2024.

(51) Int. Cl.
*B03B 9/00* (2006.01)
*B01D 15/20* (2006.01)
*B01J 20/30* (2006.01)

(52) U.S. Cl.
CPC .............. *B03B 9/00* (2013.01); *B01D 15/206* (2013.01); *B01J 20/3071* (2013.01); *B01J 20/3092* (2013.01)

(58) Field of Classification Search
CPC ...... B03B 9/00; B01D 15/206; B01J 20/3071; B01J 20/3092
USPC .......................................................... 209/10
See application file for complete search history.

(56) References Cited

U.S. PATENT DOCUMENTS 8,741,256 B1 6/2014 Harrison
9,034,294 B1 5/2015 Harrison
10,604,414 B2 3/2020 Featherstone
10,648,061 B2 5/2020 Cheng
11,174,532 B1 * 11/2021 Harrison ................. B01J 20/08
11,235,282 B2 2/2022 Harrison
(Continued)

FOREIGN PATENT DOCUMENTS

CA 3100313 A1 11/2019
CA 3234620 A1 * 4/2023 .............. C22B 3/24
(Continued)

OTHER PUBLICATIONS

International Search Report and Written Opinion received for PCT Application No. PCT/IB2024/054955, mailed on Oct. 23, 2024, 12 pages.

(Continued)

*Primary Examiner* — Terrell H Matthews
(74) *Attorney, Agent, or Firm* — BUCHANAN INGERSOLL & ROONEY PC

(57) ABSTRACT

There is disclosed a method and apparatus for improving lithium yield of lithium lithium-selective media in one or more packed-bed columns in a direct lithium extraction process. The method comprises the steps of a) passing the lithium-selective media and a stream of process fluid through a screening zone; and b) collecting a portion of lithium-selective media having a required particle-size distribution and/or free of contaminants.

15 Claims, 4 Drawing Sheets

(56) References Cited

U.S. PATENT DOCUMENTS

| | | | |
|---|---|---|---|
| 11,365,128 | B2 * | 6/2022 | Marston ................. C01D 15/04 |
| 11,958,753 | B2 | 4/2024 | Marston |
| 12,221,671 | B2 | 2/2025 | Harrison et al. |
| 2019/0256987 | A1 * | 8/2019 | Snydacker ........... B01D 9/0004 |
| 2020/0189924 | A1 | 6/2020 | Featherstone |
| 2020/0189925 | A1 | 6/2020 | Featherstone |
| 2021/0087697 | A1 | 3/2021 | Riabtsev |
| 2021/0371293 | A1 | 12/2021 | Gibaud |
| 2021/0380429 | A1 | 12/2021 | Snydacker |
| 2022/0010408 | A1 | 1/2022 | Harrison |
| 2022/0055910 | A1 | 2/2022 | Jariwala |
| 2022/0105466 | A1 | 4/2022 | Harrison |
| 2022/0324717 | A1 | 10/2022 | Marston |
| 2023/0086861 | A1 | 3/2023 | Perroni |
| 2023/0203619 | A1 | 6/2023 | Wei |
| 2023/0303401 | A1 | 9/2023 | Harrison |
| 2023/0357942 | A1 | 11/2023 | Perroni |
| 2023/0364560 | A1 | 11/2023 | Sams |
| 2023/0366062 | A1 | 11/2023 | Sams |
| 2024/0026495 | A1 | 1/2024 | Snydacker et al. |
| 2024/0375972 | A1 | 11/2024 | Dupont et al. |

FOREIGN PATENT DOCUMENTS

| | | | | |
|---|---|---|---|---|
| CA | 3215144 | A1 * | 5/2023 | ............ H01M 10/54 |
| CL | 2012001191 | A1 | 1/2013 | |
| CL | 2021000923 | A1 | 10/2021 | |
| CN | 1263678 | C | 7/2006 | |
| CN | 108264066 | A | 7/2018 | |
| EP | 2749535 | A1 * | 7/2014 | ............... C25B 1/46 |
| EP | 2749535 | B1 | 7/2019 | |
| EP | 3793945 | A1 | 3/2021 | |
| EP | 4589035 | A1 * | 7/2025 | ............. B01D 15/22 |
| JP | 2020011193 | A | 1/2020 | |
| JP | 2020012153 | A | 1/2020 | |
| WO | WO-2018089932 | A1 * | 5/2018 | ............... C22B 3/42 |
| WO | 2018190754 | A2 | 10/2018 | |
| WO | 2019160982 | A1 | 8/2019 | |
| WO | WO-2019168941 | A1 * | 9/2019 | ............... C22B 3/42 |
| WO | 2019221932 | A1 | 11/2019 | |
| WO | WO-2022007660 | A1 * | 1/2022 | ............. C22B 26/12 |
| WO | 2023022627 | A1 | 2/2023 | |
| WO | 2023200653 | A1 | 10/2023 | |
| WO | 2023205073 | A1 | 10/2023 | |
| WO | 2024016080 | A1 | 1/2024 | |
| WO | 2025018915 | A1 | 1/2025 | |
| WO | 2025029172 | A1 | 2/2025 | |
| WO | 2025029953 | A1 | 2/2025 | |

OTHER PUBLICATIONS

International Search Report and Written Opinion received for PCT Application No. PCT/IB2025/051055, mailed on May 8, 2025, 17 pages.

Office Action (Resolution notifying the expert report) issued on Apr. 16, 2026 in Chilean Application No. 2025-00304 (29 pages).

Finster, M. et al."Geothermal produced fluids Characteristics, treatment technologies, andmanagement options" Renewable and Sustainable Energy Reviews, vol. 50, 2015, pp. 952-966.

Office Action (Expert Examiner Report) issued on Apr. 20, 2026 in Chilean Application No. 2025-00296, (20 pages).

* cited by examiner

METHOD FOR IMPROVING LITHIUM YIELD IN A DIRECT LITHIUM EXTRACTION PROCESS

TECHNICAL FIELD

The present disclosure relates to a method for improving lithium yield in a direct lithium extraction process, and more specifically to a method for improving lithium yield from lithium-selective media in one or more packed-bed columns in a direct lithium extraction process.

BACKGROUND

Many chemical process industries use complex and expensive heterogeneous catalysts for conversion of feedstock, or adsorbent materials for select adsorption of target molecules. Although sometimes overlooked, the solids-handling practices associated with the loading and unloading of solid materials into and out of reactors or columns can have a significant impact on not only the ultimate performance of the process, but also the operation efficiency of the process and the safety of the personnel involved. Even the most highly engineered solid catalysts and adsorbent materials can exhibit reduced performance and present safety hazards if they are not correctly handled and loaded.

One such newly emerging process industry is the process of direct lithium extraction ("DLE") which is developing to meet an anticipated growth in the global lithium market driven by increasing demands of lithium-ion batteries for electric vehicles. The main stages of a DLE process include extraction of lithium from an aqueous lithium salt-containing solution such as a brine using lithium-selective media, and subsequent elution of the lithium from this lithium-selective media with an eluant to produce an eluate stream containing lithium chloride, followed by further concentration and purification steps. It is desirable to maximize the lithium yield from the DLE process, the yield being a function of how much lithium chloride can be adsorbed from the aqueous lithium salt-containing solution per unit time and per unit volume lithium-selective media multiplied by the purity of the lithium chloride in the eluate stream.

The lithium-selective media may be, for example, an ion exchange resin or an adsorbent material. Loading and unloading such lithium-selective media encompasses a wide range of operations, and there remains a need for efficient processes for pre-treatment, particle size selection, regeneration and cleaning of the media to improve flow distribution inside the column or bed, remove contaminants, improve kinetics of lithium uptake by the lithium-selective media and also prevent any settling of material and/or unpredictable pressure drops across or within the column or bed thereby ensuring a more reliable operation, improved performance and increase in lithium yield in the direct lithium extraction process.

SUMMARY

In a first aspect herein, the present disclosure provides a method for improving lithium yield of lithium-selective media in one or more packed-bed columns in a direct lithium extraction process, the method comprising the steps of:

a) passing the lithium-selective media and a stream of process fluid through a screening zone; and
b) collecting a portion of lithium-selective media having a required particle-size distribution and/or free of contaminants.

In an embodiment, the screening zone comprises a first sieve element having a mesh size of approximately 2.0 mm; and further comprising the step of collecting lithium-selective media having a particle-size of ≤2.0 mm.

In an embodiment, the screening zone further comprises a second sieve element having a mesh size of approximately 0.1 mm; and further comprising the step of collecting lithium-selective media having a particle-size of ≥0.1 mm and ≤2.0 mm.

In an embodiment, there is an additional step preceding the step (a) of unloading the lithium-selective media from the one or more packed-bed columns.

In an embodiment, there is an additional step preceding the step of unloading the lithium-selective media from the one or more packed-bed columns of monitoring for one or more of (i) an abnormal flow distribution through the one or more packed-bed columns; (ii) a pressure drop through the one or more packed-bed columns; (iii) a deterioration in lithium purity of an eluate stream from the one or more packed-bed columns; and (iv) presence of a contaminant.

In an embodiment, there is an additional step (c) of loading the lithium-selective media in to the one or more packed-bed columns.

In an embodiment, the lithium-selective media is an ion sieve adsorbent, a lithium-metal oxide adsorbent, a mixed metal oxide adsorbent, an alkali or alkali earth metal/alumina matrix, transition metal/alumina matrix or a molecular sieve adsorbent.

In an embodiment, the screening zone has a sieving capacity of at least 1 $m^3$/hour of lithium-selective media and a targeted separation of >90%.

In an embodiment, the process fluid is water, pH adjusted water, salt water, a polar organic solvent or derived from the direct lithium extraction process.

In an embodiment, the water is distilled water, reverse-osmosis process-recycled water or derived from an external source.

In an embodiment, the process fluid for removing the contaminant is surfactant-based, a coagulant, a flocculant, hydrocarbon based, pH adjusted water and/or a gas.

In an embodiment, the process fluid is single-phase or multi-phase.

In an embodiment, there is an additional step of dewatering the collected lithium-selective media and/or the lithium-selective media having a particle-size distribution of ≤0.1 mm and ≥2.0 mm.

In an embodiment, the collected lithium-selective media and/or the lithium-selective media having a particle-size distribution of ≤0.1 mm and ≥2.0 mm is pumped as a slurry to a water collection tank for the dewatering step.

In an embodiment, water obtained from the dewatering process is returned to the direct lithium extraction process.

In a second aspect herein, there is disclosed apparatus for improving lithium yield of lithium-selective media in one or more packed-bed columns in a direct lithium extraction process, the apparatus comprising:

a) means to convey a process fluid to the lithium-selective media;
b) a screening zone comprising at least a first sieve element; and
c) a collection zone for collecting a portion of lithium-selective media having a required particle-size distribution and/or free of contaminants.

In an embodiment, the first sieve element has a mesh size of approximately 2.0 mm.

In an embodiment, there is a second sieve element having a mesh size of approximately 0.1 mm and a collection zone for collecting lithium-selective media having a particle-size distribution of ≥0.1 mm and ≤2.0 mm.

In an embodiment, the process fluid is water, pH adjusted water, salt water, a polar organic solvent, derived from the direct lithium extraction process, surfactant-based, a coagulant, a flocculant, hydrocarbon based, pH adjusted water and/or a gas.

In an embodiment, the apparatus is modular and/or portable.

Other features and aspects of the disclosure are set forth in greater detail below.

DETAILED DESCRIPTION

Figure 1:
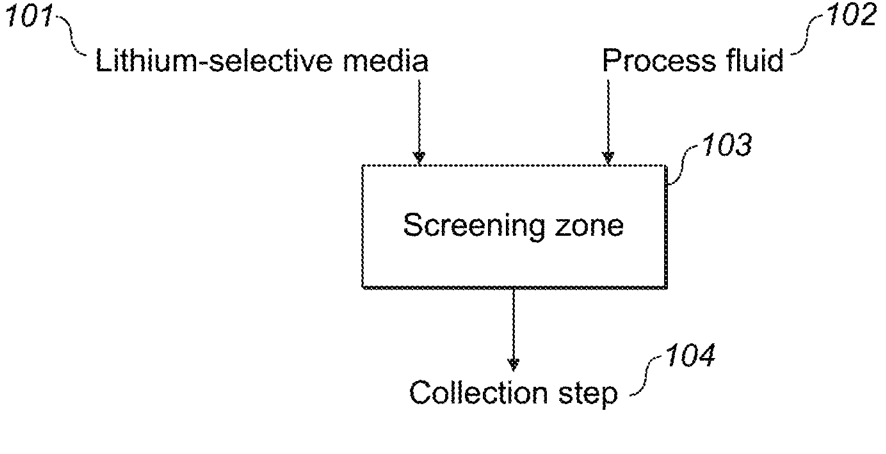
FIG. 1 is a flowchart depicting the present disclosure.

Unless otherwise defined, all scientific and technical terms used herein are intended to have the same meaning as would be understood by a person of skill in the art to which this disclosure relates. The materials, methods and examples are illustrative only and not intended to be limiting. The word "comprise" and variations such as "comprises" or "comprising" are understood to mean the inclusion of a stated integer or group of integers but not the exclusion of any other integer or group of integers.

Unless specifically stated otherwise or obvious from the context used herein, the terms "about" and "approximately" are understood as lying within a range of normal tolerances in the art, for example within two standard deviations of the mean. "About" and "approximately" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The main stages of a direct-lithium extraction ("DLE") process include selective extraction of lithium cations from an aqueous lithium salt-containing solution using lithium-selective media, and subsequent elution of the lithium from this lithium-selective media with an eluant to produce an eluate stream containing lithium chloride, followed by further concentration and purification steps.

The source of the aqueous lithium salt-containing solution is not limited by the disclosure but may originate from a variety of sources such as any of a geothermal source, oil fields, hard rock lithium mining, aquifers, mineral digestion, tailings from a lithium mining process, a well application, a clay, a leachate or sea water. Alternatively, the aqueous lithium salt-containing solution may be produced synthetically by extraction from a lithium-containing material and may be, for example, any aqueous recycling solution containing lithium chloride. Examples of lithium-containing materials include clays, black mass, off-specification battery materials, recycled battery materials or combinations of these materials; the resulting extractant in these examples comprises acidity and cations. Examples of components of the extractant are hydrochloric acid, sodium chloride, potassium chloride, perchloric acid and chloric acid. The extractant is then pH adjusted to the desired range for a specific sorbent. The aqueous lithium salt-containing solution may therefore be a naturally occurring solution, a leachate, a synthetic solution, or a combination thereof. The aqueous lithium salt-containing solution may be a brine and may be present in the aqueous lithium salt-containing solution as, for example, lithium chloride.

The aqueous lithium salt-containing solution is introduced to a direct lithium extraction process which comprises a processing system having adsorbent media and/or ion exchange resin in one or more columns or beds for selectively extracting lithium cations from the aqueous lithium salt-containing solution. The adsorbent media and/or ion exchange resin are selective to lithium cations and allow lithium cations to be selectively extracted from the aqueous lithium salt-containing solution.

The specific nature of the lithium-selective adsorbent is not limited by the disclosure but may be any of an ion sieve adsorbent, a lithium-metal oxide adsorbent, a mixed metal oxide adsorbent, an alkali or alkali earth metal/alumina matrix, transition metal/alumina matrix or a molecular sieve adsorbent. The ion exchange resin may comprise ion exchange particles, the material of which may, for example, include insoluble polymers containing a backbone of cross-linked polystyrene and side chains of ion-active groups.

The lithium-selective adsorbent may be a layered aluminum double hydroxide chloride sorbent ($LiCl·Al2(OH)6·nH2O$) which has a high selectivity to lithium cations. The lithium-selective sorbent can allow for the extraction or recovery of a relatively high amount of lithium from the aqueous lithium salt-containing solution. For instance, the amount of lithium adsorbed from the aqueous lithium salt-containing solution may be 20 mol % or more, such as 30 mol % or more, such as 40 mol % or more, such as 50 mol % or more, such as 60 mol % or more, such as 70 mol % or more, such as 80 mol % or more, such as 90 mol % or more, such as 95 mol % or more based on the total amount of lithium present in the aqueous lithium salt-containing solution. It should be understood that the uptake may be based on the total amount of lithium present in the aqueous lithium salt-containing solution that is provided to the lithium-selective media. In this regard, the aqueous lithium salt-containing solution containing lithium may be converted to a barren brine. The barren aqueous lithium salt-containing solution may be returned to the source from which it was originally obtained or an alternative geological formation.

The present disclosure is directed to a method for improving lithium yield of lithium-selective media in one or more packed-bed columns (also known in the field as fixed-bed columns or beds) in a direct lithium extraction process, the method comprising the steps of passing the lithium-selective media and a stream of process fluid through a screening zone; and collecting a portion of lithium-selective media having a required particle-size and/or free of contaminants.

In the context of solids-handling practices of lithium-selective media, the numerous operations include transporting the lithium-selective media from a vendor or manufacturing site to a DLE site; pre-bagging which transfers the lithium-selective media from its original vendor packaging to intermediate hoppers; and loading which conveys the lithium-selective media from intermediate hoppers (or directly from vendor packaging) to one or more columns or beds in the direct lithium extraction process. Ahead of the operation of loading, the lithium-selective media may need to be prepared in order to improve its capacity for lithium uptake and this may require the removal of at least a portion of any under-sized solids, dust and fines. Such under-sized particulates may be generated in transport, pre-bagging stages and handling of the material as lithium-selective media is typically fragile and can decompose when not handled appropriately. There may also be a requirement to remove at least a portion of any over-sized solids, and/or other materials such as ceramic balls that can be used as an inert support, and/or contaminants. Therefore, the present disclosure is applicable to fresh lithium-selective media ahead of its loading into a column before commencement of the DLE process, or at any point during a DLE process when there is a need for replacement of lithium-selective media.

Furthermore, during operation of the one or more packed-bed columns in a direct lithium extraction process, particulate fines may be generated due to, for example, attrition of lithium-selective media or electrostatic attraction of foreign particulates. In these instances, removal of at least a portion of the under-sized solids, dust and fines must be carried out to prevent detrimental issues with operation of the lithium-selective media in the one or more packed-bed columns such as high pressure drop or poor flow distribution. There may also be a requirement to remove at least a portion of any over-sized solids, and/or other materials. The lithium-selective media may also become contaminated by one or more foreign materials during operation of the direct lithium extraction process. Reference herein to "contaminants" means any material or foulant that has a detrimental effect on the direct lithium extraction process. In such situations, the lithium uptake of the lithium-selective media decreases, thereby reducing the lithium yield of the DLE process. Such contaminants therefore need to be removed or at least subject to a reduction in their level. Therefore, the present disclosure is also applicable to previously-used lithium-selective media, and which needs to be subject to a process for removal of at least a portion of the media which does not have the required particle size and/or subject to a cleaning process to remove contaminants.

The present disclosure provides a method of improving yield from lithium-selective media in a direct lithium extraction process, and such an improvement can lead to an increase in lithium purity in a downstream eluate. Lithium purity is a measure of the lithium against all components other than water or other volatile solvents and is instead concerned with the non-volatile components in the solution. Examples of these components are sodium, calcium, boron, chloride, sulfates, and carbonates. The nonvolatile components are often measured or expressed collectively as Total Dissolved Solids (TDS) and it is desirable in a direct lithium extraction process to obtain an eluate stream with as high as possible lithium: TDS ratio. Typically, elution methods use a high degree of loading on the column and subsequently utilize the portion of the eluate stream with the highest concentrations of lithium. It is therefore advantageous in a direct lithium extraction process for lithium uptake by the lithium-selective media to be as high as possible, as this can influence the lithium yield in the downstream eluate, and consequently the lithium purity.

The presently disclosed method of improving lithium yield of lithium-selective media is achieved by removing at least a portion of i) under-sized solids, dust and fines, ii) over-sized solids, and iii) any contaminants, all of which can cause high pressure drops, reduced kinetics of lithium uptake and poor flow distribution, negatively affecting the efficiency of the direct lithium extraction process and the lithium yield in the downstream eluate. The rate of lithium uptake by lithium-selective media is a function of particle diameter as well as other factors such as porosity and number of active sites. As is the case with any adsorbent and catalyst manufacturing process, a portion of material outside the ideal size parameters is present due to a variety of mechanisms such as attrition or electrostatic attraction of foreign particulate. The present disclosure provides a method of improving lithium yield by removal of both a portion of material outside the ideal size parameters and also some or all contaminants in order to prevent detrimental issues with lithium uptake by lithium selective media in one or more packed bed columns, such as high pressure drop, reduced kinetics of lithium uptake and/or poor flow distribution.

Specifically, if the particle size of the lithium selective media is too small, this may cause unwanted high pressure drops (high dP). When high pressure drops occur, the flow rate to the column is reduced. Such a reduction in flow rate to the column leads to a reduction in lithium yield because the amount of lithium processed per unit time is reduced.

Conversely, if the particle size of the lithium selective media is too large, the kinetics of lithium uptake by the lithium selective media is slower. If the kinetics of lithium uptake is slower, the lithium loading cycle onto the column is slower so that the amount of lithium processed per unit time is reduced, ultimately leading to a reduction in lithium yield.

If the particle size distribution is too variable, then column packing efficiencies are poor and consequently flow distribution within the column is poor. Poor flow distribution negatively impacts eluate purity because flow is not uniform through the column which leads to the feed void contaminating the lithium product cut in the eluate stream. In addition, poor flow distribution leads to poor utilization (for example, inefficient use of active sites) of lithium selective media within the column and the lithium processed per unit time is low, ultimately leading to a reduction in lithium yield.

Furthermore, if the lithium selective media is fouled by contaminants, the lithium yield is low because the lithium uptake is impeded by the contaminants. Washing and screening the lithium selective media to remove the contaminants improves the lithium yield.

Figure 3A:
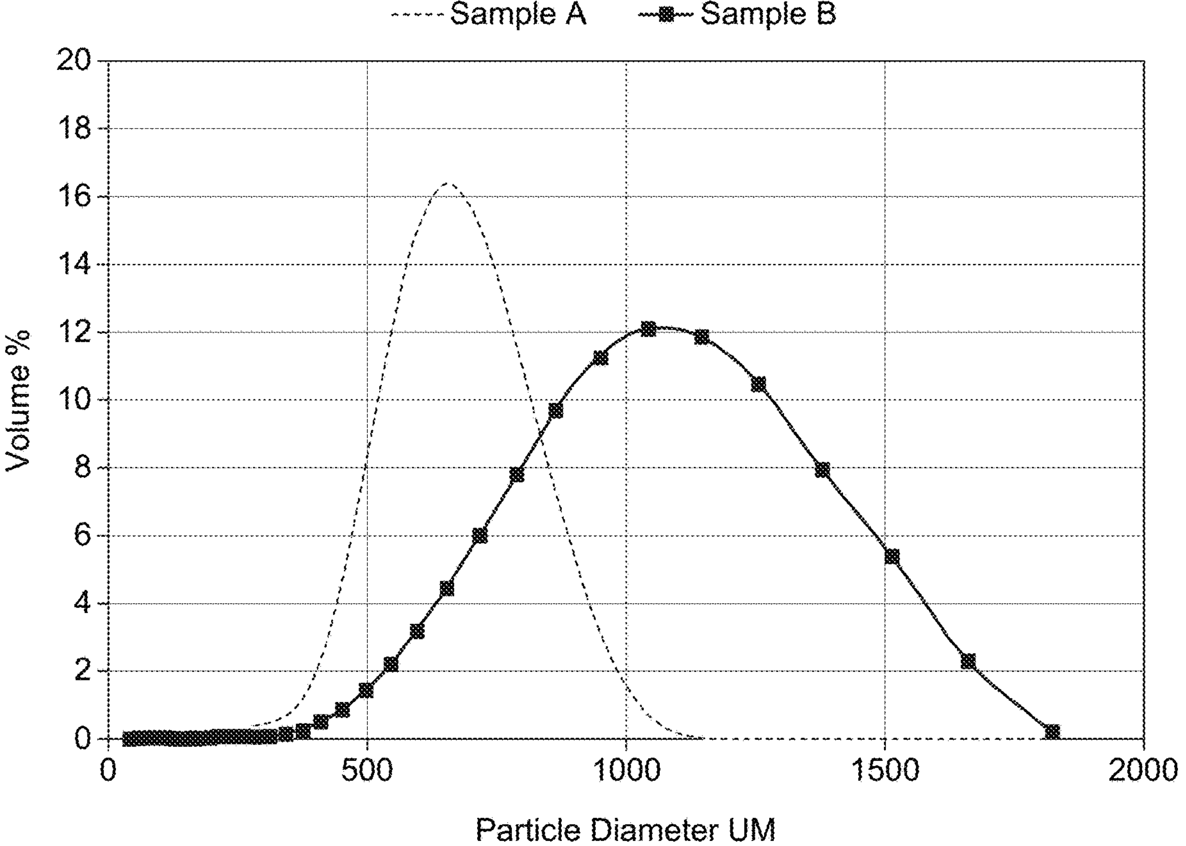
FIG. 3A is a chart showing the particle size distribution of two samples of lithium-selective media.

As shown in FIG. 1, the presently disclosed method comprises the steps of a) passing the lithium-selective media 101 and a stream of process fluid 102 through a screening zone 103; and b) a step 104 of collecting a portion of lithium-selective media having a required particle-size and/or free of contaminants. The lithium-selective media is typically of a granular nature and an optimum particle size of lithium-selective media typically has a particle-size distribution of 0.2 mm to 1.5 mm, with a preferred particle-size distribution of 0.3 mm to 1.0 mm and more particularly 0.4 mm to 0.8 mm. Specifically, approximately 75% of particles have a preferred particle-size distribution of 0.4 mm to 0.8 mm, as shown in FIG. 3A. Such a required particle-size distribution comprises the exclusion of a portion of i) under-sized solids, dust and fines and ii) over-sized solids, such that the remaining lithium-selective media comprises the particle-size distribution required for an efficient direct lithium extraction process, free from any unwanted high pressure drop across the column(s), reduced kinetics of lithium uptake and poor flow distribution. Furthermore, the collected lithium-selective media is free from, or has a reduced level of, contaminants, also contributing to an efficient direct lithium extraction process with an improved lithium yield.

The screening zone has the purpose of removing some or all of the i) under-sized solids, dust and fines, ii) over-sized solids, and iii) contaminants. The screening zone comprises a first sieve element having a mesh size of approximately 2.0 mm. However, other mesh sizes fall within the scope of this disclosure, and the first sieve element may, for example, have a mesh size in the range of approximately 1.5 mm to 2.5 mm, such as approximately 1.5 mm, 1.6 mm, 1.7 mm, 1.8 mm, 1.9 mm, 2.1 mm, 2.3 mm, 2.3 mm, 2.4 mm or 2.5 mm. The first sieve element may be fabricated from any suitable material known in the art, such as a polymer, for example polyurethane. The lithium-selective media is passed, along with a stream of process fluid, through the first sieve element. Particles of lithium-selective media having a particle-size of approximately ≥2.0 mm do not pass through the first sieve element and can therefore be separated from the particles of lithium-selective media having a particle-size distribution of approximately ≤2.0 mm. The particles of lithium-selective media having a particle-size distribution of ≥2.0 mm may include over-sized solids and/or contaminants. The particles of lithium-selective media having a particle-size distribution of approximately ≤2.0 mm may be collected and ultimately loaded into one or more packed-bed columns and used in the DLE process. In an embodiment, the particles of lithium-selective media having a particle-size distribution of approximately ≤2.0 mm may be collected, subject to a dewatering process and subsequently loaded into one or more packed-bed columns. The particles of lithium-selective media having a particle-size distribution of approximately ≥2.0 mm may be subject to a dewatering process as described below and then removed from the direct lithium extraction process.

The screening zone may comprise a second sieve element having a mesh size of approximately 0.1 mm. However, other mesh sizes fall within the scope of this disclosure, and the second sieve element may, for example, have a mesh size in the range of approximately 0.05 mm to 0.6 mm, such as 0.1 mm, 0.2 mm, 0.3 mm, 0.4 mm, 0.5 mm or 0.6 mm. The second sieve element may be fabricated from any suitable material known in the art, such as a polymer, for example polyurethane. The lithium-selective media is passed, along with a stream of process fluid, through the first sieve element and subsequently through the second sieve element. Particles of lithium-selective media having a particle-size distribution of approximately ≤2.0 mm which have already passed through the first sieve element are exposed to the second sieve element. The particles of lithium-selective media having a particle-size distribution of approximately ≥0.1 mm do not pass through the second sieve element and can therefore be separated from the other particles of lithium-selective media having a particle-size distribution of approximately ≤0.1 mm. The particles of lithium-selective media having a particle-size distribution of ≤0.1 mm may include under-sized solids, dust and fines generated by, for example, processes of attrition or electrostatic attraction of foreign particulates. The particles of lithium-selective media having a particle-size distribution of approximately ≥0.1 mm and ≤2.0 mm may be collected and loaded into one or more packed-bed columns. In an embodiment, the particles of lithium-selective media having a particle-size distribution of approximately ≥0.1 mm and ≤2.0 mm may be collected, subject to a dewatering process and subsequently loaded into one or more packed-bed columns. The particles of lithium-selective media having a particle-size distribution of approximately ≤0.1 mm may be subject to a dewatering process as described below and then removed from the process.

The presently disclosed method comprising the steps of a) passing the lithium-selective media and a stream of process fluid through a screening zone; and b) collecting a portion of lithium-selective media having a required particle-size distribution and/or free of contaminants may be applied to virgin lithium-selective media which is fresh material to be loaded into one or more columns prior to start-up of a direct lithium extraction process (or fresh material as required during the DLE process) and also to used lithium-selective media that has been previously unloaded from one or more packed-bed columns for a cleaning and/or regeneration process. In the former case, the method may include the step of loading the lithium-selective media into the one or more packed-bed columns in advance of the start-up of the direct lithium extraction process. In the latter case, the method also includes the step of unloading the lithium-selective media from the one or more packed-bed columns via chutes, hoses or piping, washing and removal of some or all of i) under-sized solids, dust and fines, ii) over-sized solids, and iii) contaminants and then reloading of the cleaned lithium-selective media and/or lithium-selective media of the required particle size and free of contaminants into the one or more packed-bed columns.

There may be an additional step preceding the unloading step of monitoring for one or more of (i) an abnormal flow distribution through the one or more packed-bed columns; (ii) a pressure drop through the one or more packed-bed columns; (iii) a deterioration in lithium purity of an eluate stream from the one or more packed-bed columns; and (iv) presence of a contaminant. Any or all of these may indicate that there is a decrease in lithium uptake by the lithium selective media and there is a need to unload the lithium selective media and remove any or all of i) under-sized solids, dust and fines, ii) over-sized solids, and iii) contaminants.

The screening zone has a sieving capacity of at least 1 $m^3$/hour of lithium-selective media, and preferably at least 5 $m^3$/hour of lithium-selective media. Furthermore, the screening zone has a targeted separation of greater than 90%, and preferably greater than 95%.

The method of the present disclosure may comprise the step of passing the lithium-selective media and a stream of process fluid through a screening zone. The process fluid may be any of water, pH adjusted water, salt water, a polar organic solvent or a stream derived from the direct lithium extraction process. When water is used as the process fluid, the water may be distilled water, reverse-osmosis process-recycled water or derived from an external source. Effective washing must be able to quickly move the lithium-selective media through the screening zone. The washing with this process fluid is applicable to both virgin lithium-selective media before it is used for the first time in a direct lithium extraction process and also previously-used lithium-selective media comprising some or all of under-sized solids, dust and fines, over-sized solids and contaminants. When applicable for previously-used lithium-selective media, there may have been a detection of any or all of (i) an abnormal flow distribution through the one or more packed-bed columns; (ii) a pressure drop through the one or more packed-bed columns; or (iii) a deterioration in lithium purity of an eluate stream from the one or more packed-bed columns, or (iv) presence of a contaminant, indicating the presence of some or all of under-sized solids, dust and fines, over-sized solids and/or contaminants, and a consequential need for removal and regeneration of the previously-used lithium-selective media. When applicable for contaminated previously-used lithium-selective media, there is an additional cleaning stage as later described herein.

The method of the present disclosure comprises the step of collecting a portion of lithium-selective media having a required particle-size distribution and/or free of contaminants. In an embodiment, the method of the present disclosure comprises the step of collecting lithium-selective media having a particle-size of ≤2.0 mm or the step of collecting lithium-selective media having a particle-size of ≥0.1 mm and ≤2.0 mm. The present disclosure further comprises a step of dewatering (namely, removing water) from the lithium-selective media having a required particle-size, and that has been collected. Further still, the lithium-selective media which does not have the required particle-size distribution, and that has not been collected in accordance with the present disclosure may also be subject to water removal in a dewatering step. This is termed herein as the discarded material.

A portion of the lithium-selective media having the required particle-size, which may be either virgin lithium-selective material or previously-used lithium-selective material, and the discarded material is typically pumped as a slurry to a water collection tank for the dewatering step.

Advantageously, water obtained from these above-described dewatering steps can be re-used for circulation in the direct lithium extraction process. The challenge of conservation of water in direct lithium extraction processes is a known problem, as frequently such direct lithium extraction processes are situated in close proximity to underground brine sources which are in remote, arid regions where water is scarce. Any process feature to conserve and re-use/recycle water is highly desirable from an economic and environmental perspective.

The method of the present disclosure is also for removing contaminants from the lithium-selective media. When the method of the present disclosure is deployed in a cleaning capacity to remove to remove contaminants from the lithium-selective media, the method is typically deployed to remove contaminants from previously-used lithium-selective media. In such a cleaning capacity, the process fluid may be surfactant-based, a coagulant, a flocculant, hydrocarbon based, pH adjusted water and/or a gas. Such process fluids may be used in any combination, such that the process fluid may be single-phase or multi-phase. For example, the process fluid may comprise an aqueous surfactant-based solution in addition to a gas such as nitrogen. The previously-used lithium-selective media is mixed with the appropriate process fluid in a suitable vessel which may include means for stirring, rotation or agitation of the previously-used lithium-selective media with the process fluid to ensure a thorough cleaning (through a high degree of contact of the lithium-selective media with the process fluid). Laboratory scale testing may be required on a case-by-case basis to determine the most appropriate process fluid for cleaning and the appropriate amount. Once the previously-used lithium-selective media has been subject to such a cleaning process, the contaminated cleaning solution is collected and removed from the system, for example, via a drainage system. The previously-used lithium-selective media is transferred to a receiving hopper and subject to the presently disclosed method steps of passing the lithium-selective media and a stream of process fluid through a screening zone; and collecting a portion of lithium-selective media having a required particle-size distribution and/or free of contaminants. Such a process fluid may be any of water, pH adjusted water, salt water, a polar organic solvent or a stream derived from the direct lithium extraction process. When water is used as the process fluid, the water may be distilled water, reverse-osmosis process-recycled water or derived from an external source. The portion of lithium-selective media that has been collected, in addition to the discarded portion, is subject to a dewatering process as previously described.

In summary, the presently disclosed method may be used for i) virgin lithium-selective media for particle size selection prior to use before start-up of a direct lithium extraction process; ii) lithium-selective media that has been previously unloaded from one or more previously operated packed-bed columns for particle size selection and iii) lithium-selective media that has been unloaded from one or more previously operated packed-bed columns for a cleaning/regeneration process.

In a second aspect, the present disclosure provides apparatus for improving the lithium yield of lithium-selective media in one or more packed-bed columns in a direct lithium extraction process, the apparatus comprising:

a) means to convey a process fluid to the lithium-selective media;
b) a screening zone comprising at least a first sieve element; and
c) a collection zone for collecting a portion of lithium-selective media having a required particle-size distribution and/or free of contaminants.

The claimed apparatus may be a modular system that is assembled from separate parts at the site of the direct lithium process and/or may be portable such that the apparatus is, for example, a wheel mounted skid that can be retracted by a truck or fitted to a standard container, and subsequently parked at the process area and connected by hoses such as quick connection hoses to the one or more columns.

The apparatus may be used for i) virgin lithium-selective media for particle size selection prior to use before start-up of a direct lithium extraction process; ii) lithium-selective media that has been previously unloaded from one or more previously operated packed-bed columns for particle size selection and iii) lithium-selective media that has been previously unloaded from one or more previously operated packed-bed columns for a cleaning/regeneration process.

Figure 2:
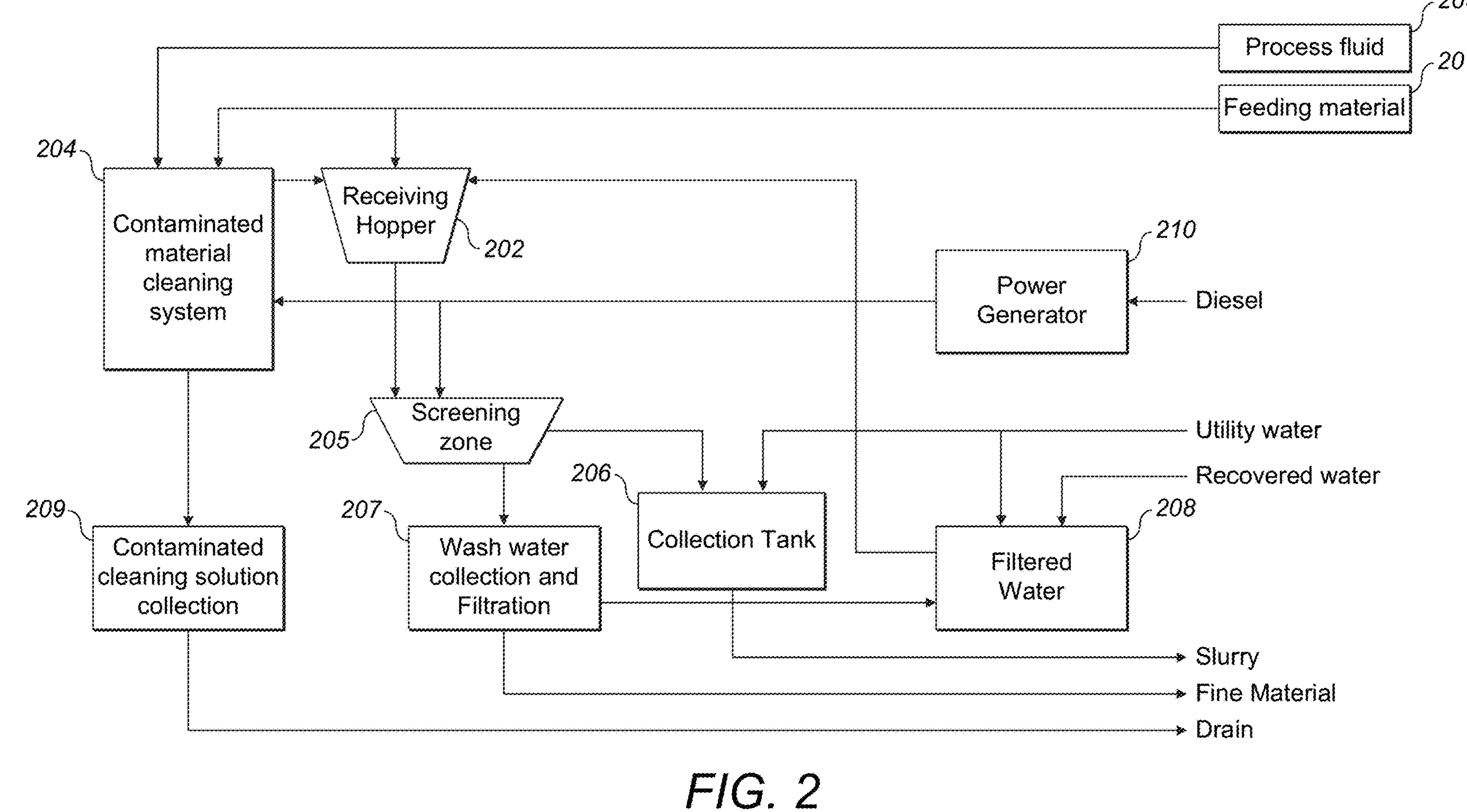
FIG. 2 is a flowchart depicting the present disclosure.

Therefore, when the apparatus is used for i) virgin lithium-selective media for particle size selection prior to use before start-up of a direct lithium extraction process or ii) lithium-selective media that has been previously unloaded from one or more previously operated packed-bed columns for particle size selection, reference is made to FIG. 2 wherein virgin lithium-selective media (feeding material) 201 is loaded into a container such as receiving hopper 202. The means to convey a process fluid 203 to the lithium-selective media may comprise for example, tubing or a spraying vessel, which enables exposure of the lithium-selective media to a process fluid. The process fluid may be any of water, pH adjusted water, salt water, a polar organic solvent or a stream derived from the direct lithium extraction process. When water is used as the process fluid, the water may be distilled water, reverse-osmosis process-recycled water or derived from an external source. Effective washing must be able to quickly move the lithium-selective media through the screening zone and also aim to reduce the amount of utility water required.

The claimed method and apparatus comprises passing the lithium-selective media 201 and the stream of process fluid 203 through a screening zone 205. With reference to FIG. 2, screening zone 205 comprises a first sieve element having a mesh size of approximately 2.0 mm. Particles of lithium-selective media having a particle-size distribution of ≥2.0 mm do not pass through the first sieve element and can therefore be separated from the particles of lithium-selective media having a particle-size distribution of ≤2.0 mm. The particles of lithium-selective media having a particle-size distribution of ≥2.0 mm may include over-sized solids and contaminants, which may cause the kinetics of lithium uptake by the lithium selective media to be reduced. If the kinetics of lithium uptake is slower, the lithium loading cycle onto the column is slower so that the amount of lithium processed per unit time is reduced, ultimately leading to a reduction in lithium yield. Screening zone 205 may also comprise a second sieve element having a mesh size of approximately 0.1 mm. Particles of lithium-selective media having a particle-size distribution of ≤2.0 mm which have already passed through the first sieve element are exposed to the second sieve element. The particles of lithium-selective media having a particle-size distribution of ≥0.1 mm do not pass through the second sieve element and can therefore be separated from the other particles of lithium-selective media having a particle-size distribution of ≤0.1 mm. The particles of lithium-selective media having a particle-size distribution of ≤0.1 mm may include under-sized solids, dust and fines generated by, for example, processes of attrition or electrostatic attraction of foreign particulates. Such under-sized solids, dust and fines may cause unwanted high pressure drops (high dP). When high pressure drops occur, the flow rate to the column is reduced. Such a reduction in flow rate to the column leads to a reduction in lithium yield because the amount of lithium processed per unit time is reduced. In an embodiment, screening zone 205 has a sieving capacity of at least 1 $m^3$/hour of lithium-selective media, and preferably at least 5 $m^3$/hour of lithium-selective media. Furthermore, screening zone 205 has a targeted separation of greater than 90%, and preferably greater than 95%.

The claimed method and apparatus comprise a collection zone for collecting lithium-selective media having a required particle size. As illustrated herein, the first sieve element allows particles having a particle-size of ≤2.0 mm to pass through and be collected in collection tank 206. Screening zone 205 may also comprise a second sieve element having a mesh size of approximately 0.1 mm, thereby allowing particles having a particle-size of ≤0.1 mm to pass through. In such cases where screening zone 205 comprises a first and a second sieve element, particles of lithium-selective media having a particle-size distribution of ≤0.1 mm to 2.0 mm may be collected in collection tank 206.

The claimed method and apparatus may further comprise a dewatering step (namely, removing water) from the portion of the lithium-selective media having a required particle-size, and that has been collected. Further still, the lithium-selective media which does not have the required particle-size distribution, and that has not been collected in accordance with the present disclosure may also be subject to water removal in a dewatering step. This is termed herein as the discarded material. With reference to FIG. 2, the portion of the lithium-selective media having the required particle-size, as well as the discarded material, is typically pumped as a slurry to a water collection tank 207 for the dewatering step. Advantageously, water from these above-described dewatering steps is filtered and such filtered water 208 can be re-used for circulation in the direct lithium extraction process. The filter in water collection tank 207 may be a self-cleaning filter. The conservation of water in direct lithium extraction processes is a known problem, as frequently such direct lithium extraction processes are situated in close proximity to underground brine sources which are in remote, arid regions where water is scarce. Any process feature to conserve and re-use/recycle water is highly desirable from an economic and environmental reasons.

In an alternative embodiment and with reference to FIG. 2, wherein previously-used lithium-selective media is contaminated and needs to be subject to removal of contaminants, the contaminated and previously-used lithium-selective media (feeding material) 201 is loaded into contaminated material cleaning vessel 204. Process fluid 203 is added, for example, by piping, to the contaminated and previously-used lithium-selective media. For cleaning purposes, the process fluid may also be surfactant-based, a coagulant, a flocculant, hydrocarbon based, pH adjusted water and/or a gas. Such process fluids may be used in any combination, such that the process fluid may be single-phase or multi-phase. For example, the process fluid may comprise an aqueous surfactant-based solution in addition to a gas such as nitrogen. The previously-used lithium-selective media is subject to the appropriate process fluid in vessel 204 which may include means for stirring, rotation or agitation of the previously-used lithium-selective media with the process fluid to ensure a high degree of cleaning. Once the previously-used lithium-selective media has been subject to such a cleaning process in vessel 204, the contaminated cleaning solution is collected in vessel 209 and removed from the system, for example, via a drainage system. The previously-used lithium-selective media is transferred to receiving hopper 202 and subject to the presently disclosed method steps of passing the lithium-selective media and a stream of process fluid through screening zone 205; and collecting a portion of lithium-selective media having a required particle-size distribution and/or free of contaminants in collection tank 206. Such a process fluid may be any of water, pH adjusted water, salt water, a polar organic solvent or a stream derived from the direct lithium extraction process. When water is used as the process fluid, the water may be distilled water, reverse-osmosis process-recycled water or derived from an external source. The portion of lithium-selective media that has been collected in tank 206, in addition to the discarded portion, is subject to a dewatering process as previously described.

All vessels in the claimed apparatus are typically fabricated from stainless steel and then rubbed-lined prior to use. However, other construction materials are within the spirit of the disclosure. The claimed apparatus has a power generator 210 with a sufficient capacity to run the system in full capacity in addition to extra capacity for emergencies and maintenance requirements.

The processes of the disclosure will now be more particularly described with reference to the following non-limiting Examples.

EXAMPLES

Example 1: Effect of Sieving on Pressure Drop Across a Column Packed with Lithium Selective Media in a Direct Lithium Extraction Process A sample of DLE media with a particle size distribution as shown by Sample A in FIG. 3A was obtained from a commercial supplier and loaded into a column made of a chlorinated polyvinyl chloride material, having a height of 4 ft and an inner diameter of 1 inch. The column was connected to a 10 wt % sodium chloride (NaCl) brine feed pump and the pump was turned on and set to a flow rate of 135 ml/min. However, due to a pressure drop of 82 psig across the column, the maximum brine flow rate only achieved a flow rate of 20 ml/min.

The feed pump was turned off and a valve at the bottom of the column was opened to drain the media from the column. The media was collected in a container and transferred to a wet sieve apparatus equipped with a 0.05 mm mesh screen and washed with a dilute sodium chloride solution. The wet sieving apparatus consisted of a 0.05 mm mesh screen mounted on a frame above a water tank. A spray nozzle was attached to the frame to provide a dilute NaCl solution for washing the media. The media was spread evenly on the screen and washed with the spray nozzle. The media retained on the 0.05 mm mesh screen was weighed and it was calculated that 3.5 wt % fines of less than 0.05 mm were removed from the media.

After this wet sieving, the media was recharged in the same 4 ft column and re-connected to the brine feed pump. After reinstating a brine feed rate of 135 ml/min, the pressure drop across the column was reduced to 18 psig.

This demonstrated that removal of 3.5 wt % fines of less than 0.5 mm caused a reduction in pressure drop across the column, from 82 psig to 18 psig.

Example 2: Optimum Media Particle Size

Wet sieving of a varying particle size mixture of media between 0.1 mm and 2.0 mm was shown to produce the specific particle size distribution (PSD) samples as shown in FIG. 3A. Sample A had a PSD with 90% of media between 0.4 mm and 0.8 mm while Sample B had a PSD with 90% of media greater than 0.7 mm. Separate columns having a height of 4 ft and an inner diameter of 1 inch were filled with Sample A and Sample B media.

Figure 3B:
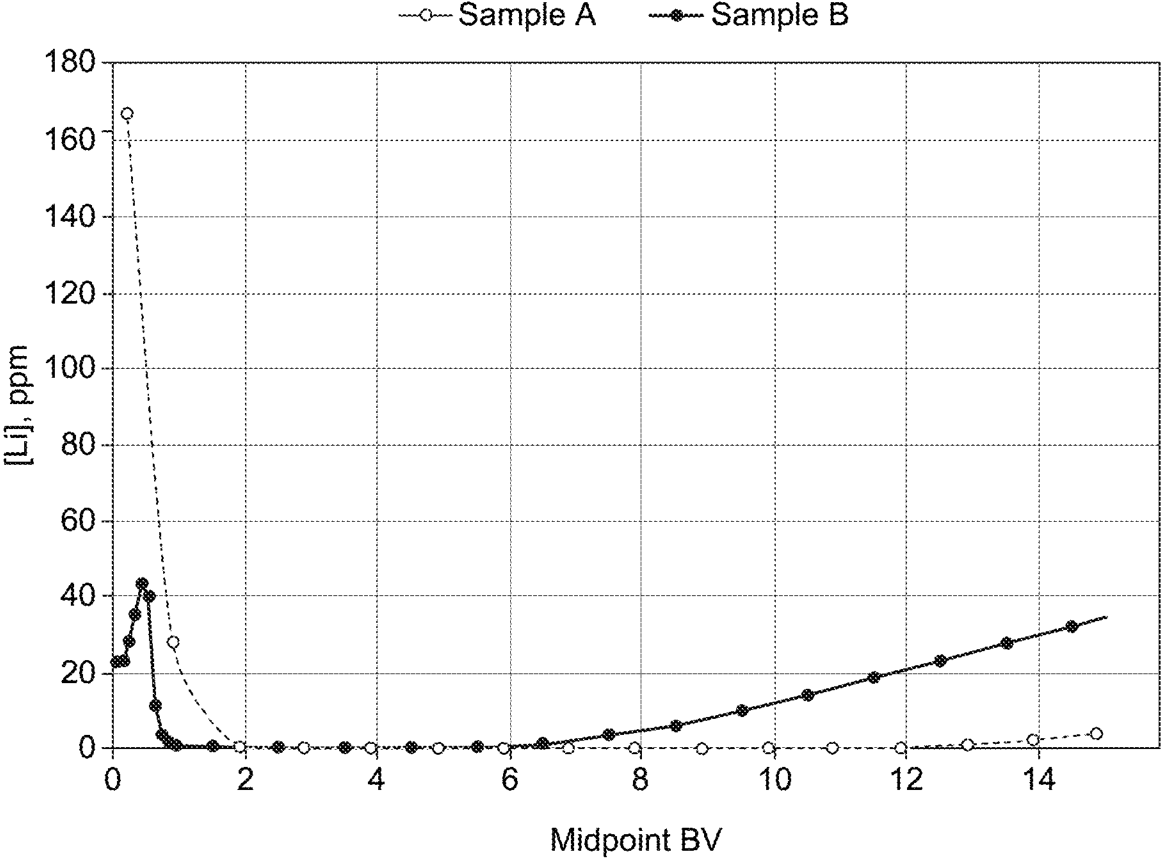
FIG. 3B is a chart showing the lithium uptake versus bed volume of media as a function of media particle size.

A synthetic brine solution containing 100 ppm lithium (Li) as lithium chloride (LiCl), 90,000 ppm sodium (Na) as sodium chloride (NaCl) and 16,000 ppm calcium (Ca) as calcium chloride ($CaCl_2$)) was fed separately to each column at a flow rate of 135 ml/min and periodic samples of the column exhaust were collected and analyzed by ICP-OES for Li ppm concentration. FIG. 3B shows the Li uptake vs bed volume of media as a function of media particle size. Enhanced lithium adsorption of Sample A media is observed by the prolonged bed volume of synthetic feed delivered prior to lithium being observed in the column exhaust.

The invention claimed is:

1. A method for processing lithium-selective media in one or more packed-bed columns in a direct lithium extraction process, the method comprising the steps of:

a) unloading the lithium-selective media from one or more packed-bed columns;

b) passing the lithium-selective media and a stream of process fluid through a screening zone, wherein the screening zone comprises a first sieve element having a first mesh size of approximately 1.5 mm to 2.5 mm; and c) collecting a first portion of the lithium-selective media having a particle-size no greater than the first mesh size, wherein the first portion of the lithium-selective media is separated from a second portion of the lithium-selective media having a particle-size larger than the first mesh size.

2. The method according to claim 1, the first mesh size is approximately 2.0 mm.

3. The method according to claim 1, wherein the screening zone further comprises a second sieve element having a second mesh size of approximately 0.05 mm to 0.6 mm; and further comprising a step of collecting lithium-selective media having a particle-size that is no greater than the first mesh size and no smaller than the second mesh size.

4. The method according to claim 1, further comprising, prior to step (a), an additional step of identifying one or more of (i) a poor flow distribution through the one or more packed-bed columns; (ii) a high pressure drop through the one or more packed-bed columns; (iii) a deterioration in lithium purity of an eluate stream from the one or more packed-bed columns; and (iv) presence of a contaminant.

5. The method according to claim 1, further comprising an additional step (ed) of loading the lithium-selective media into the one or more packed-bed columns.

6. The method according to claim 1, wherein the lithium-selective media is an ion sieve adsorbent, a lithium-metal oxide adsorbent, a mixed metal oxide adsorbent, an alkali or alkali earth metal/alumina matrix, transition metal/alumina matrix or a molecular sieve adsorbent.

7. The method according to claim 1, wherein the screening zone has a sieving capacity of at least 1 $m^3$/hour of lithium-selective media and a targeted separation of >90%, as measured by a percentage of particles having a size that meets the required particle size distribution.

8. The method according to claim 1, wherein the process fluid is water, pH adjusted water, salt water, a polar organic solvent or derived from the direct lithium extraction process.

9. The method according to claim 8, wherein the water is distilled water, reverse-osmosis process-recycled water or derived from an external source.

10. The method according to claim 1, wherein the process fluid for removing the contaminant is surfactant-based, a coagulant, a flocculant, hydrocarbon based, pH adjusted water, or a gas.

11. The method according to claim 10, wherein the process fluid is single-phase or multi-phase.

12. The method according to claim 2, further comprising an additional step of dewatering one or more of the first portion of the lithium-selective media and the second portion of the lithium-selective media.

13. The method according to claim 12, wherein the one or more of the first portion of the lithium-selective media and the second portion of the lithium-selective media is pumped as a slurry to a water collection tank for the dewatering step.

14. The method according to claim 13, wherein water obtained from the dewatering process is filtered and returned to the direct lithium extraction process.

15. The method according to claim 3, wherein the second mesh size is approximately 0.1 mm.

* * * * *